United States Patent
Kim

(10) Patent No.: US 6,791,395 B2
(45) Date of Patent: Sep. 14, 2004

(54) BOOST CIRCUIT FOR PROVIDING CONSTANT PUMP VOLTAGE

(75) Inventor: Yong Hwan Kim, Cheongjoo-Shi (KR)

(73) Assignee: Hynix Semiconductor Inc, Ichon-shi (KR)

( * ) Notice: Subject to any disclaimer, the term of this patent is extended or adjusted under 35 U.S.C. 154(b) by 0 days.

(21) Appl. No.: 10/316,893

(22) Filed: Dec. 12, 2002

(65) Prior Publication Data

US 2003/0214349 A1 Nov. 20, 2003

(30) Foreign Application Priority Data

May 17, 2002 (KR) ................................. 10-2002-0027483

(51) Int. Cl.[7] .................................................. G05F 3/02
(52) U.S. Cl. ...................................... 327/536; 363/59
(58) Field of Search ................................ 327/534, 536, 327/537; 363/59

(56) References Cited

U.S. PATENT DOCUMENTS

| | | | | | |
|---|---|---|---|---|---|
| 5,546,031 | A | * | 8/1996 | Seesink | 327/155 |
| 5,602,794 | A | * | 2/1997 | Javanifard et al. | 365/226 |
| 5,606,491 | A | * | 2/1997 | Ellis | 363/60 |
| 6,429,725 | B1 | * | 8/2002 | Tanzawa et al. | 327/536 |
| 6,483,282 | B1 | * | 11/2002 | Bayer | 323/315 |
| 6,486,729 | B2 | * | 11/2002 | Imamiya | 327/536 |

* cited by examiner

Primary Examiner—Terry D. Cunningham
(74) Attorney, Agent, or Firm—Jacobson Holman PLLC

(57) ABSTRACT

The present invention relates to a boost circuit. A precharge voltage of a positive voltage applied to a capacitor is constantly applied regardless of the power supply voltage, so that the pumping voltage is constantly and stably generated. The operating characteristic and reliability of the circuit can be improved.

10 Claims, 3 Drawing Sheets

BOOST CIRCUIT FOR PROVIDING CONSTANT PUMP VOLTAGE

BACKGROUND OF THE INVENTION

1. Field of the Invention

The invention relates generally to a boost circuit, and more particularly to, a boost circuit capable of constantly maintaining a pumping voltage regardless of variation in a power supply voltage.

2. Description of the Prior Art

In order to improve the level of integration and lower power consumption, a research on circuits that operates at a low operating voltage has recently been made actively. In order for the device to operate, a voltage higher than the power supply voltage (Vcc) is required as the operating voltage, if necessary. To this end, it is required that the power supply voltage be boosted to a target voltage. A boost circuit is a circuit for boosting the power supply voltage to the target voltage.

A construction of a conventional boost circuit will be described by reference to FIG. 1. FIG. 1 is a circuit diagram of the conventional boost circuit for explaining the construction and operation of the boost circuit.

The boost circuit includes a pumping capacitor C101, a precharge unit 110, a voltage dividing unit 120 and a kick signal generating unit 130.

The pumping capacitor C101 is connected between a first node N101 being an output node and a second node N102. The precharge unit 110 serves to apply the precharge voltage of the pumping capacitor C101 to the first and second nodes N101 and N102 according to a non-inverted pumping signal (BOOST). The voltage dividing unit 120 is connected between the second node N102 and a ground voltage (Vss) terminal and generates a divided voltage (VBREF). The kick signal generating unit 130 compares the divided voltage (VBREF) from the voltage dividing unit 120 with the reference voltage (VREF) and also applies the kick signal (VKICK) to the second node N102 according to the inverted pumping signal (BOOSTB) to boost the voltage of the first node N101 to the pumping voltage (VBOOST). A load capacitor C102 is connected between the first node N101 being the output node and the ground voltage (Vss) terminal.

In the above, the precharge unit 110 is connected between the power supply voltage (Vcc) terminal and the first node N101. The precharge unit 110 includes a first switching means P101 driven by the inverted pumping signal (BOOST), an inverting means L101 for inverting the non-inverted pumping signal (BOOST), and a second switching means N101 connected between the second node N102 and the ground voltage (Vss) terminal and driven by the output signal of the inverting means L101. At this time, the first switching means P101 may be implemented using a PMOS transistor, the second switching means N101 may be implemented using a NMOS transistor and the inverting means L101 may be implemented using an inverter.

Further, the voltage dividing unit 120 includes a plurality of resistors (only two first and second resistors are shown in the drawing, R121 and R122) serially connected between the second node N102 and the ground voltage (Vss) terminal. The plurality of the resistor R121 and R122 divide the voltage of the second node N102 to generate the divided voltage (VBREF).

Meanwhile, the kick signal generating unit 130 includes a switching means P131 connected between the power supply voltage (Vcc) terminal and the second node N102, for switching the power supply voltage (Vcc), a comparator 131 for comparing the divided voltage (VBREF) and the reference voltage (VREF), and a driving unit 132 to which the inverted pumping signal (BOOSTB) is applied as an enable signal, for driving the switching means P131 so that the kick signal (VKICK) is applied to the second node N102 according to the output signal of the comparator 131. At this time, the switching means P131 may be implemented using a PMOS transistor. The driving unit 132 includes a NOR gate device L131 having two inputted to which the inverted pumping signal BOOSTB) and the output signal of the comparator 131 are inputted, respectively, and an inverter L132 for inverting the output signal of the NOR gate device L131 to generate the driving signal (KICKB) of the switching means P131.

FIG. 2 is a graph illustrating the signal applied to the boost circuit in FIG. 1 and a waveform of a specific node. The operation of the conventional boost circuit will be described by reference to FIG. 1 and FIG. 2.

At a precharge period (A) in which the pumping signal (BOOST) is applied as a LOW level, the first switching means P101 is turned on by the pumping signal (BOOST) and the second switching means N101 is simultaneously turned on by the inverted pumping signal (BOOSTB) through the inverting means L101. Also, the inverted pumping signal (BOOSTB) is applied to the kick signal generating unit 130 to disable the kick signal generating unit 130. In more detail, the inverted pumping signal (BOOSTB) is also applied to the NOR gate device L131 included in the driving unit 131 of the kick signal generating unit 130. If the inverted pumping signal (BOOSTB) is applied, the NOR gate device L131 of the driving unit 131 generates a signal of a LOW level. This signal is then inverted by the inverting means L132. As the switching means P131 is turned of by the output signal (KICKB) of the inverting means L132, the power supply voltage (Vcc) is not applied to the second node N102. Therefore, the power supply voltage (Vcc) is transferred to the first node N101 and the ground voltage (Vss) is also transferred to the second node N102, through the first switching means P101 and the second switching means N101 that are turned on, so that the pumping capacitor C101 is precharged. At this time, the voltage dividing unit 120 outputs the divided voltage (VBREF) as the ground voltage (Vss) by the ground voltage (Vss) transferred to the second node N102.

Next, in a pumping period (B) in which the pumping signal (BOOST) is applied as a HIGH level, the first switching means P101 is turned off by the pumping signal (BOOST). The second switching means N101 is simultaneously turned off by the inverted pumping signal (BOOSTB) through the inverting means L101.

Meanwhile, the comparator 131 of the kick signal generating unit 130 compares the divided voltage (VBREF) being the ground voltage (Vss) and the reference voltage (VREF) to generate a signal of a LOW level. This signal is then is applied to the NOR gate device L131 along with the inverted pumping signal (BOOSTB) of the LOW level, so that the NOR gate device L131 generates a signal of a HIGH level. Next, the signal of the HIGH level of the NOR gate device L131 is applied to the switching means P131 as the signal (KICKB) inverted by the inverting means L132, so that the switching means P131 is turned on. The power supply voltage (Vcc) is applied to the second node N102 through the switching means P131 that is turned on, and the voltage of the first node N101 is simultaneously boosted to the pumping voltage (VBOOST) by the pumping capacitor C101 of the precharge state. At this time, in an initial period (Bb) of the pumping period (B), a little distortion occurs in the kick signal (VKICK) as the comparator 131 compares the divided voltage (VBREF) and the reference voltage (VREF). However, this distortion is stabilized soon.

Through the above operation, the pumping voltage (VBOOST) higher than the power supply voltage (Vcc) is generated. The pumping voltage (VBOOST) is supplied to a device requiring a high voltage as the operating voltage.

In the above boost circuit, the power supply voltage (Vcc) is used as the precharge voltage of a positive voltage. If the power supply voltage (Vcc) is increased, the amount of the precharge voltage is accordingly increased. Thus, the pumping voltage (VBOOST) is generated as a voltage higher than a target voltage. As such, if the pumping voltage (VBOOST) is generated as the voltage higher than the target voltage, the device is overworked and the device may be damaged.

Therefore, in order to prevent this, the reference voltage (VREF) is lowered if the power supply voltage (Vcc) is supplied high, so that the pumping voltage (VBOOST) is constantly generated as the target voltage.

This method, however, may be applied only when the capacity of the pumping capacitor C101 is higher than the capacity of the load capacitor C102. If the capacity of the pumping capacitor C101 is lower than that of the load capacitor C102, the pumping voltage (VBOOST) is lowered as the capacity of the load capacitor C102 is increased. Thus, there is a problem that the operating voltage is not sufficiently applied to the device.

SUMMARY OF THE INVENTION

The present invention is contrived to solve the above problems and an object of the present invention is to provide a boost circuit capable of improving the operating characteristic and reliability of the circuit in such a manner that a precharge voltage of a positive voltage applied to a capacitor is supplied as a constant voltage regardless of a power supply voltage and a pumping voltage is thus stably and constantly generated.

In order to accomplish the above object, the boost circuit according to the present invention, is characterized in that it comprises a pumping capacitor connected between first and second nodes, a precharge unit for applying a precharge voltage of the pumping capacitor to the first and second nodes according to an inverted pumping signal, a voltage dividing unit connected between the first node and a ground voltage terminal, a kick signal generating unit for comparing a divided voltage generated from the voltage dividing unit and a reference voltage and simultaneously generating a kick signal to the second node according to a non-inverted pumping signal, in order to constantly boost a voltage of the first node, and a boost unit using a voltage of the first node as the precharge voltage of a positive voltage, for boosting the power supply voltage up to a target voltage according to the non-inverted pumping signal.

In the above, the precharge unit comprises a first switching means connected between a power supply voltage terminal and the first node and driven by the inverted pumping signal, an inverting means for inverting the inverted pumping signal, and a second switching means connected between the second node and the ground voltage terminal and driven by the output signal of the inverting means.

The voltage dividing unit consists of a plurality of capacitors serially connected between the first node and the ground voltage terminal. The voltage of the first node is divided by the plurality of the capacitors so that the divided voltage is generated The kick signal generating unit comprises a switching means connected between the power supply voltage terminal and the second node, for switching the power supply voltage, a comparator for comparing the divided voltage and the reference voltage, and a driving unit having an input terminal to which the non-inverted pumping signal is applied as an enable signal, wherein the driving unit drives the switching means according to the output signal of the comparator so that the kick signal is applied the second node. At this time, the driving unit comprises a NOR gate device having two input terminals to which the non-inverted pumping signal and the output signal of the comparator are inputted, respectively, and an inverter for inverting the output signal of the NOR gate device to generate a driving signal of the switching means.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
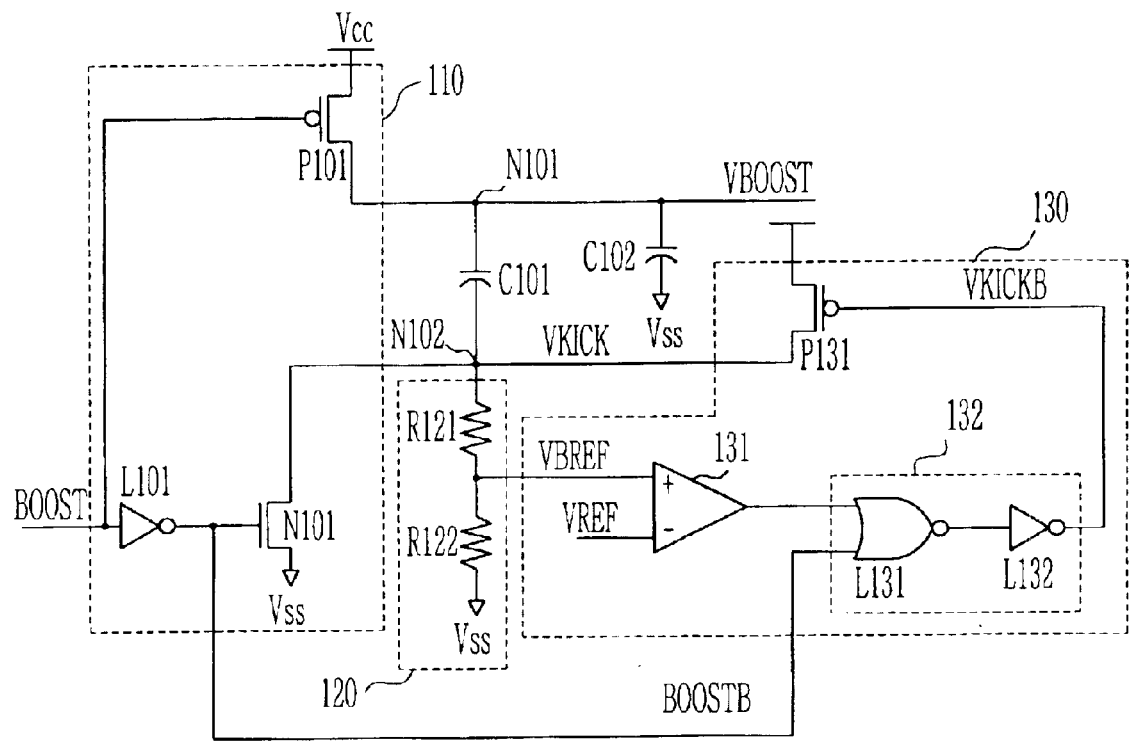
FIG. 1 is a circuit diagram of a conventional boost circuit for explaining the construction and operation of the boost circuit.
Figure 2:
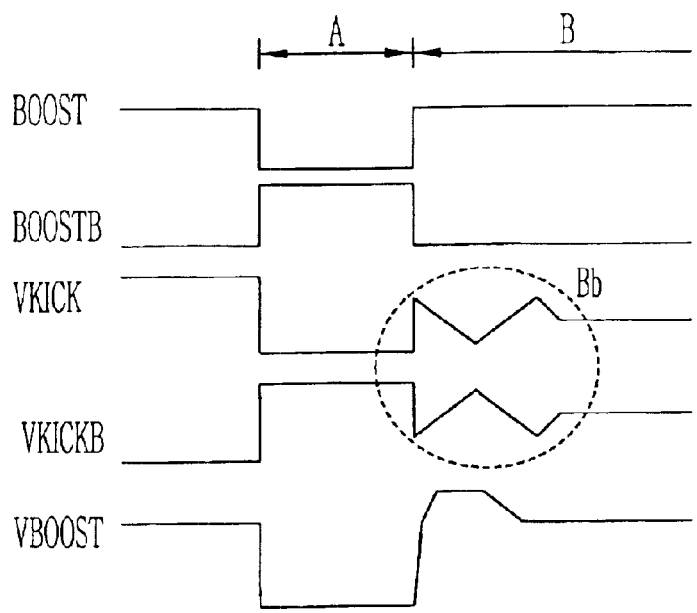
FIG. 2 is a graph illustrating a signal applied to the boost circuit in FIG. 1 and a waveform of a specific node.

The present invention will be described in detail by way of a preferred embodiment with reference to accompanying drawings, in which like reference numerals are used to identify the same or similar parts.

Figure 3:
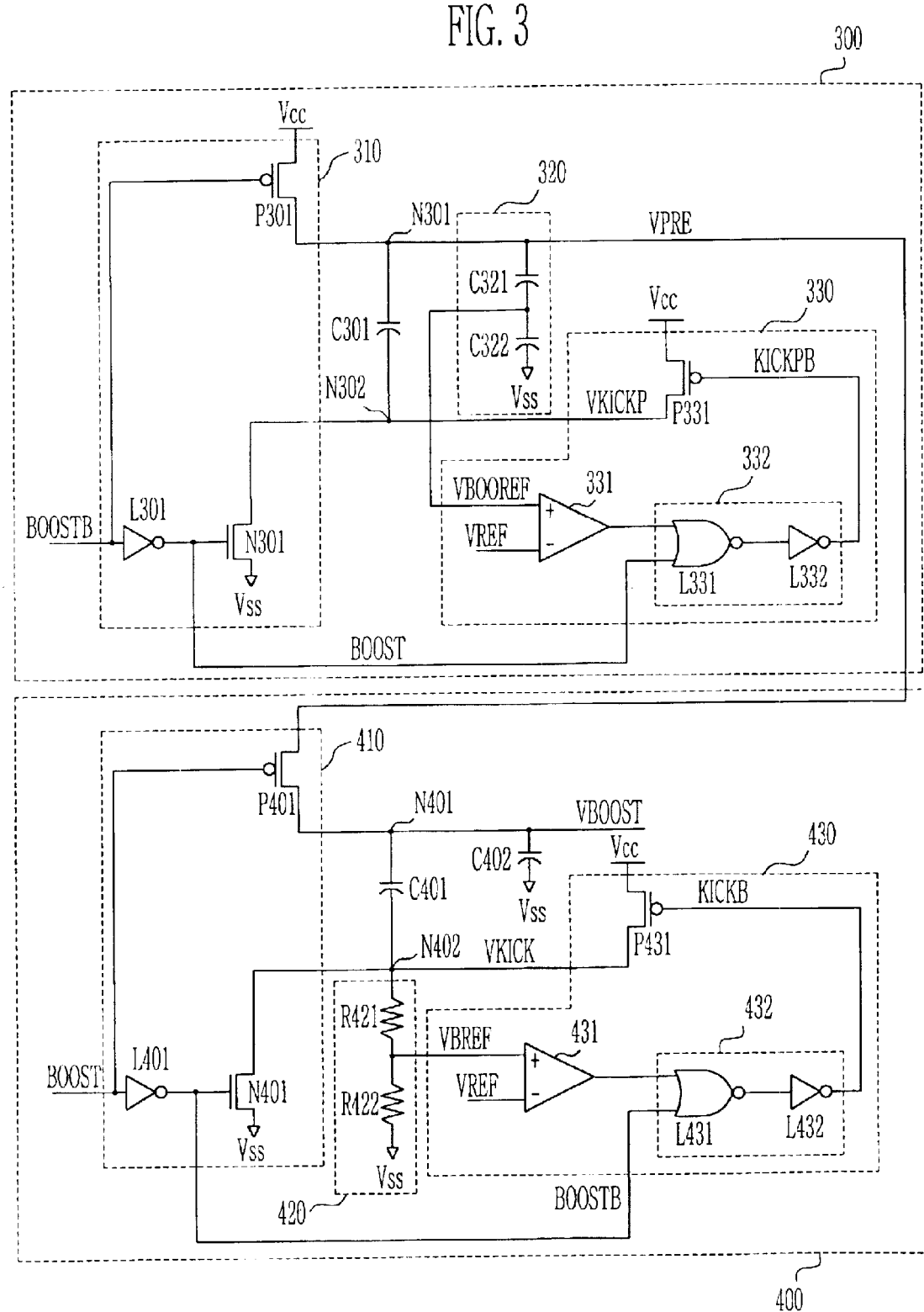
FIG. 3 is a circuit diagram of a boost circuit for explaining the construction and operation of the boost circuit according to a preferred embodiment of the present invention.

A construction of a boost circuit according to the present invention will be described by reference to FIG. 3. FIG. 3 is a circuit diagram of the boost circuit for explaining the construction and operation of the boost circuit according to a preferred embodiment of the present invention.

Referring now to FIG. 3, the boost circuit comprises as precharge voltage generating unit 300 for generating a constant precharge voltage (VPRE) regardless of variation in a power supply voltage (Vcc) according to an inverted pumping signal (BOOSTB), and a boost unit 400 for using the precharge voltage (VPRE) of the precharge voltage generating unit 300 as a precharge voltage of a positive voltage and boosting the power supply voltage (Vcc) to a target voltage to generate a pumping voltage (VBOOST) according to the non-inverted pumping signal (BOOST).

The precharge voltage generating unit 300 comprises a pumping capacitor C301, a precharge unit 310, a voltage dividing unit 320 and a precharge kick signal generating unit 330. The pumping capacitor C301 is connected between a first node N301 being an output node of the precharge voltage generating unit 300 and a second node N302. The precharge unit 310 serves to apply the precharge voltage of the pumping capacitor C301 to the first and second nodes N301 and N302 according to the inverted pumping signal (BOOSTB). The voltage dividing unit 320 is connected between the first node N301 and a ground voltage (Vss) terminal and divides the voltage of the first node N301 to generate a divided voltage (VBOOREF). The precharge kick signal generating unit 330 compares the divided voltage (VBOOREF) from the voltage dividing unit 320 with the reference voltage (VREF) and simultaneously applies a precharge kick signal (VKICKP) to the second node N302 according to the non-inverted pumping signal (BOOST) in order to boost the voltage of the first node N301 to the precharge voltage (VPRE) of a target voltage. As described above, the divided voltage (VBOOREF) of the voltage dividing unit 320 is fed back to the precharge kick signal generating unit 330 while the precharge voltage (VPRE) is generated to the first node N301 being the output terminal, so that the precharge voltage (VPRE) can be constantly generated as the target voltage even though the power supply voltage (Vcc) is varied.

In the above, the precharge unit 310 includes a first switching means P301 connected between the power supply voltage (Vcc) terminal and the first node N301 and driven by the inverted pumping signal (BOOSTB), an inverting means L301 for inverting the inverted pumping signal (BOOSTB), and a second switching means N301 connected between the second node N302 and the ground voltage (Vss) terminal and driven by the output signal of the inverting means L301. At this time, the first switching means P301 may be implemented using a PMOS transistor, the second switching means N301 may be implemented using a NMOS transistor and the inverting means L301 may be implemented using an inverter.

Further, the voltage dividing unit 320 includes a plurality of capacitors (only two first and second capacitors are shown in the drawing, C321 and C322 serially connected between the first node N301 and the ground voltage (Vss) terminal. The voltage of the first node N301 is divided by the plurality of the capacitors C321 and C322 and the divided voltage (VBOOREF) is thus generated.

Meanwhile, the precharge kick signal generating unit 330 includes a switching means P331 connected between the power supply voltage (Vcc) terminal and the second node N302, for switching the power supply voltage (Vcc), a comparator 331 for comparing the divided voltage (VBOOREF) and the reference voltage (VREF), and a driving unit 332 having an input terminal to which the non-inverted pumping signal (BOOST) is applied as an enable signal, for driving the switching means P331 so that the precharge kick signal (VKICKP) is applied to the second node N302 according to β the output signal of the comparator 331. At this time, the switching means P331 may be implemented using a PMOS transistor. Further, the driving unit 332 includes a NOR gate device L331 having two input terminals to which the non-inverted pumping signal (BOOST) and the output signal of the comparator 331 are applied, respectively, and an inverter L312 for inverting the output signal of the NOR gate device L331 to generate a driving signal (KICKPB) of the switching means P331.

Meanwhile, the boost unit 400 includes a pumping capacitor C401, a precharge unit 410, a voltage dividing unit 420 and a kick signal generating unit 430.

The pumping capacitor C401 is connected between a third node N401 being an output node and a fourth node N402. The precharge unit 410 serves to apply a precharge voltage of the pumping capacitor C401 to third and fourth nodes N401 and N402 according to the non-inverted pumping signal (BOOST). At this time, the precharge voltage (VPRE) of the precharge voltage generating unit 300 is applied to the third node N401. Also, the voltage dividing unit 420 is connected between the fourth node N402 and the ground voltage (Vss) terminal to generate the divided voltage (VBREF). Further, the kick signal generating unit 430 compares the divided voltage (VBREF) from the voltage dividing unit 420 with the reference voltage (VREF) and simultaneously the kick signal (VKICK) to the fourth node N402 according to the inverted pumping signal (BOOSTB) in order to boost the voltage of the third node N401 to the pumping voltage (VBOOST). A load capacitor C402 is connected between the third node N401 of the output node and the ground voltage (Vss) terminal.

In the above, the precharge unit 410 comprises a first switching means P401 connected between the first node N301 of the precharge voltage generating unit 300 and the third node N401 and driven by the non-inverted pumping signal (BOOST), an inverting means L401 for inverting the non-inverted pumping signal (BOOST), and a second switching means N401 connected between the fourth node N402 and the ground voltage (Vss) terminal and driven by the output signal of the inverting means L401. At this time, the first switching means P401 may be implemented using a PMOS transistor, the second switching means N401 may be implemented using a NMOS transistor and the inverting means L401 may be implemented using an inverter.

Further, the voltage dividing unit 420 comprises a plurality of resistors (only two first and second resistors are shown in the drawing, R421 and R422) serially connected between the fourth node N402 and the ground voltage (Vss) terminal. The voltage of the fourth node N402 is divided by the plurality of the resistors R421 and R422 and the divided voltage (VBREF) is thus generated.

Meanwhile, the kick signal generating unit 430 comprises a switching means P431 connected between the power supply voltage (Vcc) terminal and the fourth node N402, for switching the power supply voltage (Vcc), a comparator 431 for comparing the divided voltage (VBREF) and the reference voltage (VREF), an driving unit 432 having an input terminal to which the inverted pumping signal (BOOSTB) is applied as the enable signal, for driving the switching means P431 so that the kick signal (VKICK) is applied to the fourth node N402 according to the output signal of the comparator 431. At this time, the switching means P431 may be implemented using a PMOS transistor. Also, the driving unit 432 includes a NOR gate device L431 having two input terminals to which the inverted pumping signal (BOOSTB) and the output signal of the comparator 431 are applied, respectively, and an inverter L432 for inverting the output signal of the NOR gate device L431 to generate the driving signal (KICKB) of the switching means P431.

Figure 4:
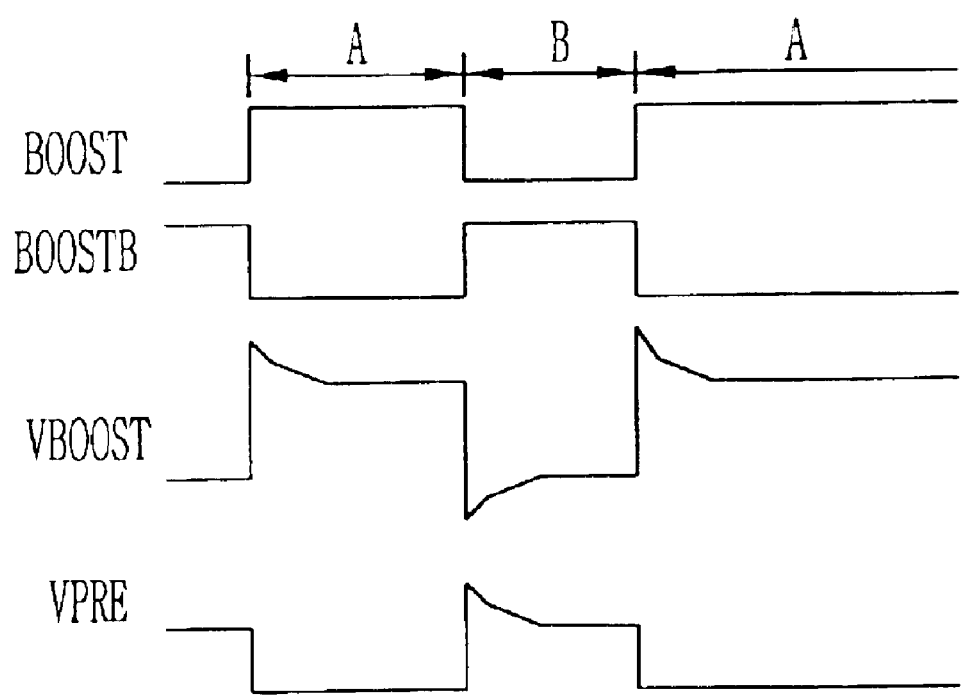
FIG. 4 is a graph illustrating a signal applied to the boost circuit in FIG. 3 and a waveform of a specific node.

FIG. 4 is a graph illustrating the signal applied to the boost circuit in FIG. 3 and a waveform of a specific node. The operation of the boost circuit according to the present invention will be described by referent to FIG. 3 and FIG. 4.

In a period (A) in which the pumping signal (BOOST) is applied as a HIGH level, an operation wherein the pumping capacitor C301 of the precharge voltage generating unit 300 is precharged in order to generate the precharge voltage (VPRE), and an operation wherein the pumping voltage (VBOOST) is generated using the pumping capacitor C401 of the boost unit 400 that is previously precharged with the precharge voltage (VPRE) generated from the precharge voltage generating unit 300, are each performed.

In a period (B) in which the pumping signal (BOOST) is applied as a LOW level, an operation wherein the precharge voltage (VPRE) is generated using the pumping capacitor C301 of the precharge voltage generating unit 300, and an operation wherein the pumping capacitor C401 of the boost unit 400 is precharged with the precharge voltage (VPRE) from the precharge voltage generating unit 300, are each performed.

The operations will be described in more detail period by period depending on the pumping signal (BOOST).

First, at an initial state, in the period (A) in which the pumping signal (BOOST) is applied as the HIGH level, the precharge voltage (VPRE) is generated from the precharge voltage generating unit 300. At this time, the pumping voltage (VBOOST) is simultaneously generated from the boost unit 400. The operation wherein the precharge voltage (VPRE) is generated is first described.

If the inverted pumping signal (BOOSTB) is applied to the precharge voltage generating unit 300, the first switching means P301 of the precharge voltage generating unit 300 is turned on by the inverted pumping signal (BOOSTB). At the same time, the second switching means N301 is turned on by the non-inverted pumping signal (BOOST) that is inverted through the inverting means L301. Also, the non-inverted pumping signal (BOOST) is applied to the precharge kick signal generating unit 330 to disable the precharge kick signal generating unit 330. In more detail, the non-inverted pumping signal (BOOST) is also applied to the NOR gate device L331 included in the driving unit 332 of the precharge kick signal generating unit 330. If the non-inverted pumping signal (BOOST) is applied, the NOR gate device L331 of the driving unit 332 generates a signal of a LOW level. This signal is then inverted by the inverting means L332. The switching means P331 is turned off by the output signal (KICKPB) of the inverting means L332, so that the power supply voltage (Vcc) is not applied to the second node N302. Thus, the power supply voltage (Vcc) is transferred to the first node N301 through the first switching means P301 and the second switching means N301 that are turned on and the ground voltage (Vss) is transferred to the second node N302, so that the pumping capacitor C301 of the precharge voltage generating unit 300 is precharged. At this time, the voltage dividing unit 320 divides the voltage of the first node N301 to generate the divided voltage (VBOOREF).

Next, in the precharge voltage generating period (B) in which the pumping signal (BOOST) is applied as the LOW level, the first switching means P301 of the precharge voltage generating unit 300 is turned of by the inverted pumping signal (BOOSTB). At the same time, the second switching means N301 is turned off by the non-inverted pumping signal (BOOST) that is inverted through the inverting means L301.

Also, the comparator 331 of the precharge kick signal generating unit 330 compares the divided voltage (VBOOREF) being the ground voltage (Vss) and the reference voltage (VREF) to generate a signal of the LOW level. This signal is then applied to the NOR gate device L331 along with the non-inverted pumping signal (BOOST) of the LOW level, so that the NOR gate device L331 generates a signal of a HIGH level. The signal of the HIGH level from the NOR gate device L331 is applied to the switching means P131 as the signal (KICKPB) that is inverted by the inverting means L332 to turn on the switching means P331. The power supply voltage (Vcc) is applied to the second node N302 through the switching means P331 that is turned on, while the voltage if the first node N301 is boosted up to the target voltage by the pumping capacitor C301 of the precharge state, so that the precharge voltage (VPRE) is generated. The precharge voltage (VPRE) is divided by the voltage dividing unit 320 and the divided voltage (VBOOREF) is fed back to the precharge kick signal generating unit 330. Thus, the precharge voltage generating unit 300 can constantly generate the precharge voltage (VPRE) as the target voltage even though the power supply voltage (Vcc) is varied. Meanwhile, in the boost unit 400, as the non-inverted pumping signal (BOOST) of the LOW level is applied to the precharge unit 410, the first switching means P401 is turned on. At the same time, the second switching means N401 is turned on by the non-inverted pumping signal (BOOST) that is inverted through the inverting means L401. As the first and second switching means P401 and P401 are turned on at the same time, the precharge voltage (VPRE) is applied to the third node N401 and the ground voltage (Vss) is applied to the fourth node N402. Thus, the pumping capacitor C401 is precharged. At this time, as the inverted pumping signal (BOOSTB) is applied to the kick signal generating unit 430 for generating the kick signal (VKICK) to disable the kick signal generating unit 430 in order to generate the pumping voltage (VBOOST), the pumping operation is not performed.

Again, in the pumping period (A), if the pumping signal (BOOST) is applied as the HIGH level, the operation for precharging the pumping capacitor C301 is performed in the precharge voltage generating unit 300. Also, in the boost unit 400, the kick signal (VKICK) is applied to the fourth node N402 and the pumping voltage (VBOOST) is generated, which will be described in more detail as follows.

The first switching means P101 of the boost unit 400 is turned off by the pumping signal (BOOST) of the HIGH level and the second switching means N101 is simultaneously turned off by the inverted pumping signal (BOOSTB) that is inverted through the inverting means L101. Thus, the operation for precharging the pumping capacitor C401 is stopped.

Meanwhile, the comparator 431 of the kick signal generating unit 430 compares the divided voltage (VBREF) being the ground voltage (Vss) and the reference voltage (VREF) to generate the signal of the LOW level. This signal is then applied to the NOR gate device L431 along with the inverted pumping signal (BOOSTB) of the LOW level. Thus, the NOR gate device L431 generates the signal of the HIGH level. The signal of the HIGH level from the NOR gate device L431 is applied to the switching means P431 as the signal (KICKB) inverted by the inverting means L432, so that the switching means P431 is turned on. The power supply voltage (Vcc) from the fourth node N402) is applied through the switching means P431 that is turned on while the voltage of the third node N401 is boosted up to the target voltage by the pumping capacitor C401 of the precharge state, so that the pumping voltage (VBOOST) is generated. Thereby, the pumping voltage (VBOOST) is generated at a constant target voltage regardless of variation in the power supply voltage (Vcc).

Through the above operation, the pumping voltage (VBOOST) higher than the power supply voltage (Vcc) is generated. Also, the pumping voltage (VBOOST) is supplied to a device requiring a high voltage as an operating voltage.

In the boost circuit, the precharge voltage (VPRE) generated in the precharge voltage generating unit 300 is used as the precharge voltage of a positive voltage of the pumping capacitor C401 in the boost unit 400. Thus, the pumping voltage (VBOOST) can be generated as a constant voltage even though the power supply voltage (Vcc) is changed. Accordingly, it is possible to prevent damage of the device.

Further, as the precharge voltage (VPRE) is the voltage generated by the pumping operation in the precharge voltage generating unit 300, a sufficient operating voltage can be supplied to the device regardless of the capacity of the load capacitor C402.

As mentioned above, according to the present invention, a constant precharge voltage is generated regardless of variation in the power supply voltage and the constant precharge voltage is also used as the precharge voltage of a positive voltage. Therefore, the present invention has an advantageous effect that it can improve the operating characteristic and reliability of the circuit.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A boost circuit, comprising:
    a precharge voltage generating unit for generating a constant precharge voltage, wherein the precharge voltage generating unit includes:
        a first pumping capacitor connected between first and second nodes, wherein the first node is an output terminal of the precharge voltage generating unit;
        a first precharge unit for applying a power supply voltage to the first node and a around voltage to the second node according to a pumping signal;
        a first voltage dividing unit connected between the first node and a ground voltage terminal for dividing a voltage of the first node; and
        a first kick signal generating unit for comparing a first divided voltage generated from the first voltage dividing unit and a reference voltage and simultaneously transferring a first kick signal to the second node according to an inverted pumping signal, in order to constantly boost the voltage of the first node; and
    a boost unit using the voltage of the first node as the precharge voltage of a positive voltage, for boosting the power supply voltage up to a target voltage according to the second inverted pumping signal.

2. The boost circuit as claimed in claim 1, wherein the first precharge unit comprises:
    a first switching means connected between a power supply voltage terminal and the first node and driven by the pumping signal;
    a first inverting means for inverting the pumping signal; and
    a second switching means connected between the second node and the ground voltage terminal and driven by an output signal of the first inverting means.

3. The boost circuit as claimed in claim 1, wherein the first voltage dividing unit consists of a plurality of capacitors serially connected between the first node and the ground voltage terminal, and wherein the voltage of the first node id divided by the plurality of capacitors so that the first divided voltage is generated.

4. The boost circuit as claimed in claim 2, wherein the first kick signal generating unit comprises:
    a third switching means connected between the power supply voltage terminal and the second node, for switching the power supply voltage;
    a first comparator for comparing the first divided voltage and the reference voltage; and
    a first driving unit for driving the third switching means according to an output signal of the comparator and the output signal of the first inverting means so that the first kick signal is applied the second node.

5. The boost circuit as claimed in claim 4, wherein the first driving unit comprises:
    a first NOR gate device having two input terminals to which the output signal of the first inverting means and the output signal of the comparator is inputted, respectively, and
    a second inverting means for inverting an output signal of the NOR gate device to generate a driving signal of the third switching means.

6. The boost circuit as claimed in claim 1, wherein the boost unit includes:
    a second pumping capacitor connected between third and fourth nodes, wherein the third node is an output terminal of the boost unit;
    a second precharge unit for applying the constant precharge voltage from the precharge voltage generating unit to the third node and the ground voltage to the fourth node according to the inverted pumping signal;
    a second voltage dividing unit connected between the fourth node and the ground voltage terminal for dividing a voltage of the fourth node; and
    a second kick signal generating unit for comparing a second divided voltage generated from the second voltage dividing unit and the reference voltage and simultaneously transferring a second kick signal to the fourth node in order to boost the voltage of the third node.

7. The boost circuit as claimed in claim 6, wherein the second precharge unit comprises:
    a fourth switching means connected between the output terminal of the precharge voltage generating unit and the third node and driven by the inverted pumping signal;
    a third inverting means for inverting the inverted pumping signal; and
    a fifth switching means connected between the fourth node and the ground voltage terminal and driven by an output signal of the third inverting means.

8. The boost circuit as claimed in claim 6, wherein the second voltage dividing unit consists of a plurality of resistors serially connected between the fourth node and the ground voltage terminal, and wherein the voltage of the fourth node is divided by the plurality of the resistors so that the second divided voltage is generated.

9. The boost circuit as claimed in claim 7, wherein the second kick signal generating unit comprises:
    a sixth switching means connected between the power supply voltage terminal and the fourth node, for switching the power supply voltage;
    a second comparator for comparing the second divided voltage and the reference voltage; and
    a second driving unit for driving the sixth switching means according to an output signal of the second comparator and an output signal of the third inverting means so that the second kick signal is applied to the fourth node.

10. The boost circuit as claimed in claim 9, wherein the second driving unit comprises:
    a second NOR gate device having two input terminals to which the output signal of the third inverting means and the output signal of the comparator are inputted, respectively; and
    a fourth inverting means for inverting the output signal of the second NOR gate device to generate a second driving signal of the sixth switching means.

* * * * *